United States Patent [19]

Roseberry

[11] 4,058,957

[45] Nov. 22, 1977

[54] DEADMAN CONTROL AND BLADE CLUTCH FOR POWER ROTARY LAWN MOWERS

[75] Inventor: Ward A. Roseberry, Galesburg, Ill.

[73] Assignee: Outboard Marine Corporation, Waukegan, Ill.

[21] Appl. No.: 709,540

[22] Filed: July 28, 1976

[51] Int. Cl.² .......................................... A01D 35/26
[52] U.S. Cl. .................................... 56/11.3; 56/11.6; 56/11.8; 192/11
[58] Field of Search ................... 56/11.3, 11.6, 11.8; 192/11

[56] References Cited
U.S. PATENT DOCUMENTS

| | | | |
|---|---|---|---|
| 3,543,892 | 12/1970 | DeBaillie | 56/11.3 |
| 4,106,709 | 4/1977 | Hauser et al. | 56/11.8 |

Primary Examiner—Jay N. Eskovitz
Attorney, Agent, or Firm—Michael, Best & Friedrich

[57] ABSTRACT

Disclosed herein is a lawn mower comprising a driven pulley drivingly connected to a cutter blade located in a blade housing, an endless belt reeved around a drive pulley and the driven pulley, an idler pulley mounted for rotation on an arm mounted for movement relative to a neutral position with the idler pulley disengaged from the belt, a first spring urging the arm from the neutral position so as to engage the idler pulley with the belt to remove slack therefrom, a control linkage movable between a drive position and a neutral position, another spring biasing the control linkage toward the neutral position, and a connection between the linkage and the arm for displacing the arm to the neutral position against the action of the first spring when the control linkage is in the neutral position and for permitting movement of the arm, under the influence of the first spring and independently of the second spring, from the arm neutral position so as to engage the belt to remove slack therefrom when the control linkage is in the drive position.

8 Claims, 4 Drawing Figures

U.S. Patent  Nov. 22, 1977  4,058,957
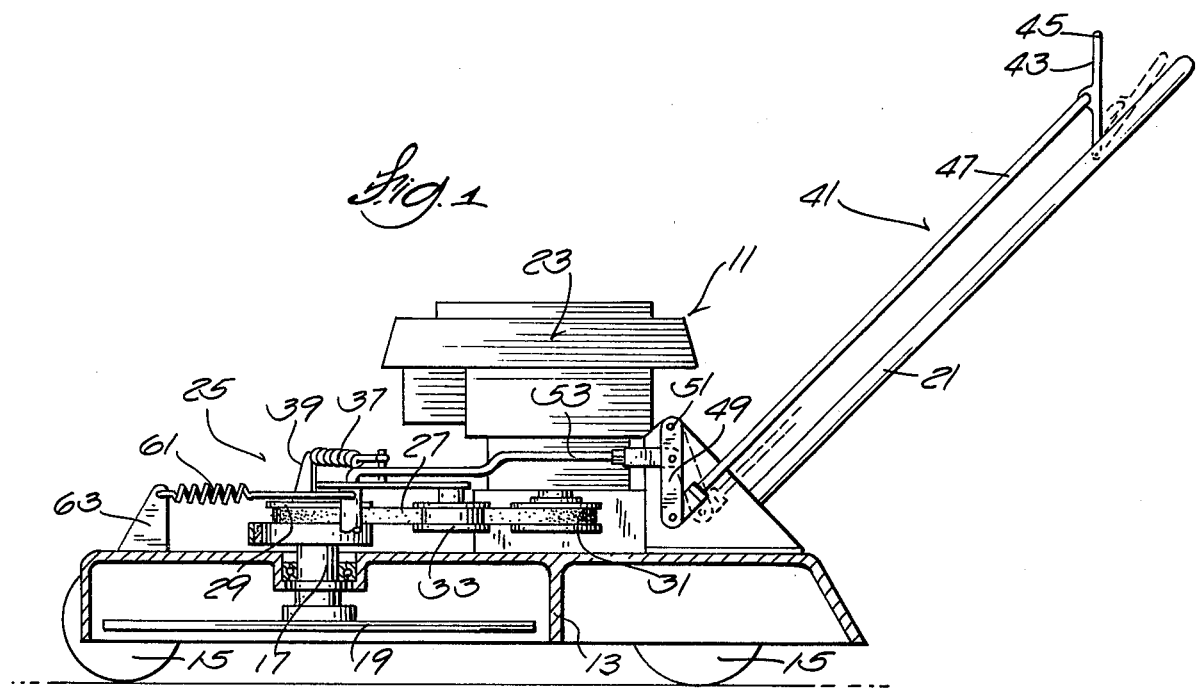
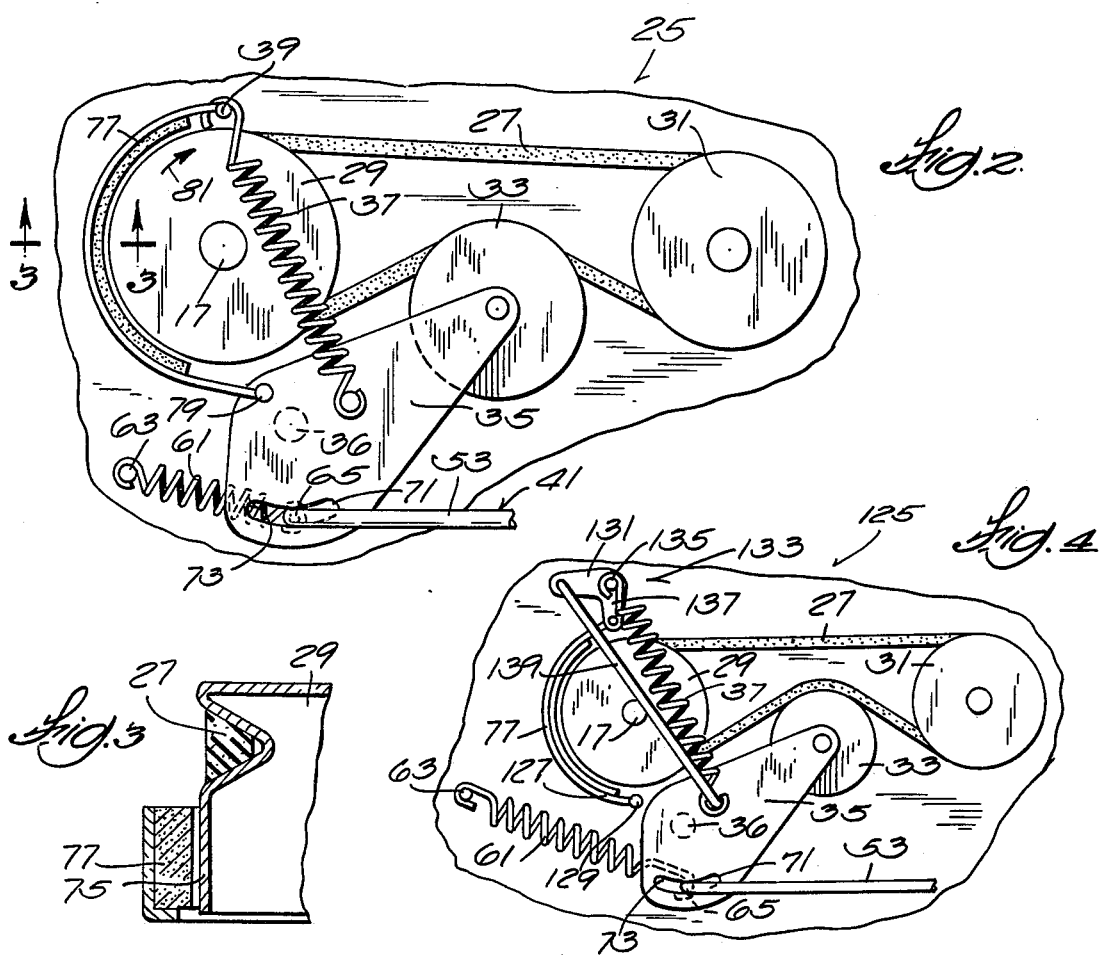

DEADMAN CONTROL AND BLADE CLUTCH FOR POWER ROTARY LAWN MOWERS

BACKGROUND OF THE INVENTON

The invention relates generally to rotary lawn mowers and, more particularly, to belt driven rotary lawn mowers. The invention is equally applicable to walk-behind and to riding rotary mowers.

Attention is directed to the following United States Patents Nos.:

| Davis | 2,530,684 |
|---|---|
| Bosworth | 2,547,738 |
| Goudie | 2,697,904 |
| True | 2,771,730 |
| Swisher | 2,899,793 |
| Musgrave | 2,957,561 |
| Wilson | 3,114,229 |
| Kamlucken | 3,123,961 |
| Rubin | 3,367,459 |
| Kamlucken | 3,440,740 |
| Musgrave | 3,460,325 |
| Debaille | 3,543,892 |
| Pitman | 3,570,637 |

SUMMARY OF THE INVENTION

The invention provides a lawn mower comprising a blade housing, a cutter blade supported for rotation by and within the blade housing, a driven pulley drivingly connected to the cutter blade for rotation of the latter in response to rotation of the former, a drive pulley adapted to be rotatably driven by a source of power, an endless belt reeved around the drive pulley and the driven pulley, an arm, an idler pulley mounted for rotation on the arm, means mounting the arm for movement relative to a neutral position with the idler pulley disengaged from the belt, means resiliently urging the arm from the neutral position so as to engage the idler pulley with the belt to remove slack therefrom, a control linkage movable between a drive position and a neutral position, means biasing the control linkage toward the neutral position, and means connecting the linkage and the arm for displacing the arm to the neutral position against the action of the arm urging means when the control linkage is in the neutral position and for permitting movement of the arm, under the influence of the arm urging means and independently of the control linkage biasing means, from the arm neutral position so as to engage the belt to remove slack therefrom when the control linkage is in the drive position.

In accordance with an embodiment of the invention, the driven pulley includes a drum portion and the lawn mower further includes a brake member mounted on the housing for movement relative to a braking position in engagement with the drum portion, together with means connecting the brake member to the arm for movement of the brake member to the braking position in response to movement of the arm to the neutral position and for movement of the brake member from the braking position when the arm is moved from the neutral position.

In one embodiment, the brake member includes a first end pivotally mounted to the housing and a second end connected to the arm. In another embodiment the brake member is connected to the arm by a bell crank member which is movably mounted on said housing, which includes a first leg connected to the brake member and a second leg, and by a rigid link connecting the second leg and the arm so that, when the arm is in the neutral position, the brake member is in the braking position, and so that, when the arm is moved from the neutral position, the brake member is moved from the braking position. In the previously mentioned embodiment, the brake member can include a first end pivotally mounted to the housing and a second end pivotally connected to the first leg of the bell crank lever and the means urging the arm from the neutral position is connected to the means movably mounting the bell crank member on the housing.

In accordance with an embodiment of the invention, the means connecting the linkage and the arm includes a lost motion connection. In one embodiment, the lost motion connection comprises a slot in the arm and a part on the control linkage extending into the slot for engagement with the arm to move the arm to the neutral position in response to movement of the control linkage to the neutral position and so as to permit movement of the arm from the neutral position under the influence of the means urging the arm when the control linkage is moved from the neutral position to the drive position.

The invention provides a rotary lawn mower including a belt-type transmission including an operating lever which is biased toward a neutral position and an idler wheel which is biased away from a disengaged or neutral position and toward engagement with the belt to remove slack therefrom so as thereby to provide a drive condition. The operating lever biasing means overpowers the idler wheel biasing means when the operating lever is in neutral. However, when the operating lever is displaced from neutral position by the operator, the dominant relationship of the operating lever biasing means over the idler wheel biasing means is terminated and the idler wheel is free to engage the belt under the influence of the idler wheel biasing means and independently of any influence by the operating lever biasing means.

The invention also provides a lawn mower as referred to in the preceeding paragraph, together with a brake mechanism which is engaged by the transmission when the operating lever is in the neutral position and which is disengaged in response to the action of the idler wheel biasing means upon movements of the operating lever away from the neutral position.

Other features and advantages of the embodiments of the invention will become known by reference to the following general description, claims, and appended drawings.

THE DRAWINGS

FIG. 1 is a partially schematic side elevational view, with parts in section, of a lawn mower embodying various of the features of the invention.

FIG. 2 is an enlarged partially schematic top plan view of the control mechanism included in the lawn mower shown in FIG. 1.

FIG. 3 is an enlarged fragmenary view taken generally along lines 3—3 of FIG. 2.

FIG. 4 is an enlarged partially schematic view of another embodiment of a control mechanism adapted to be incorporated in the lawn mower shown in FIG. 1.

Before explaining the embodiments of the invention in detail, it is to be understood that the invention is not limited in its application to the details of construction and the arrangments of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in the drawings is a lawn mower 11 which incorporates various of the features of the invention and which is in the form of a walk-behind mower. The illustrated mower 11 includes a blade housing 13 which is suitably supported for travel over the ground. While various arrangements can be employed, in the illustrated construction, the blade housing 13 is supported by a plurality of wheels 15. Rotatably supported by the blade housing 13 is a shaft 17 which carries a cutter blade 19 located within the blade housing 13.

The blade housing 13 can be steered by any suitable arrangement and, in the illustrated construction, the blade housing 13 is steered by a rearwardly and upwardly extending handle 21.

Various arrangements can be employed for rotating the cutter blade 19. In the illustrated construction, such means comprises a primer mover 23, such as an internal combustion engine or an electric motor, which prime mover 23 can be mounted on the blade housing 13, together with a control mechanism 25 for regulating power transmission from the prime mover 23 to the cutter blade 19. In the illustrated construction, the control mechansim 25 includes (See especially FIG. 2) an endless belt 27 which is trained around a driven pulley 29 fixed on the shaft 17 and a drive pulley 31 which can be mounted on the output shaft of the prime mover 23 or otherwise mounted for rotation and drivingly connected to the primer mover 23.

The control mechanism 25 further includes an idler pulley 33 and an arm 35 which rotatably carries the idler pulley 33 and which is mounted on the blade housing 13 for movement from a neutral position wherein the idler pulley 33 is disengaged from the endless belt 27. In the illustrated construction, the arm 35 is mounted by the pivot shaft 36 for pivotal movement relative to the blade housing 13.

Means are provided for biasing or urging the arm 35 away from the neutral position so as to engage the idler pulley 33 with the endless belt 27 so as to remove slack therefrom and, accordingly, to transmit power from the primer mover 23 to the cutter blade 19. While various arrangements can be employed, in the illustrated construction, such means comprises a tension spring 37 which, at one end, is anchored to the arm 35 and, which, at its other end, can be anchored to a post 39 extending from the blade housing 13. The spring 37 therefore urges the arm 35 in the counterclockwise direction as seen in FIG. 2 so as to engage the idler pulley 33 with the belt 27 to remove slack.

The control mechanism 25 also includes an operating or control linkage 41 including (See especially FIG. 1) a manually operated lever 43 and a series of links connecting the lever 43 to the arm 35. In the illustrated construction, the operating lever 43 is mounted on the handle 21 for movement between a neutral position wherein a part 45 of the lever 43 is spaced from the handle 21 and a drive position (shown in dotted outline in FIG. 1) wherein the operating lever part 45 is located adjacent to the handle 21 so as to be gripped by the operator while operating the mower.

While various links can be employed, in the illustrated construction, the operating lever 43 is pivotally connected to one end of a rigid link 47 which, in turn, at its other end, is pivotally connected to a link or lever 49 carried for arcuate movement about a pivot 51 fixed relative to the blade housing 13. In addition, the lever 49 is pivotally connected to one end of a second rigid link 53 which is connected at its other end, as will be described, to the arm 35.

Means are provided for biasing the control linkage so as to locate the operating lever 43 in the neutral position. While various arrangements can be employed, in the illustrated construction, such means comprises a tension spring 61 which, at one end, is anchored to a post 63 fixed relative to the blade housing 13 and which, at its other end, is anchored or connected to the end part 65 of the second link 53, which end part 65 is connected to the arm 35.

Referring more particularly to the connection of the second link 53 to the arm 35, the connection is arranged so that, when the operating lever 43 is in the drive position, the arm 35 is urged by the spring 37 to engage the idler pulley 33 against the endless belt 27 independently of the action of the spring 61 which biases the operating lever 43 to the neutral position. Still more particularly, the connection includes means for affording lost motion between the second link 53 and the arm 35.

In this last regard, the arm 35 includes a slot 71 which extends arcuately about a uniform radius from the pivot shaft 36 and which receives the end part 65 of the second link 53. The slot 71 is located such that, when the operating lever 43 is in the neutral position, the end part 65 of the second link 53 engages the end 73 of the slot 71 (shown to the left in FIG. 2) so as to locate the arm 35 in the neutral position with the idler pulley 33 disengaged from the endless belt. However, incident to displacement of the operating lever 43 away from the neutral position and toward the drive position, the end part 65 of the link 53 operatively disengages the end 73 of the slot 71 and moves in the slot 71 relative to the arm 35. Under such circumstances, the arm 35 is then free to follow the urging of the spring 37, independently of the spring 61. Accordingly, the arm 35 is urged so as to engage the idler pulley 33 with the belt 27. With this arrangement, movement of the arm 35 to engage the idler pulley 33 with the belt 27 can desirably vary depending upon conditions and independently of the bias on the operating lever 43.

It is to be noted that the spring 61 biasing the operating lever 43 is sufficiently strong to overpower the spring 37 biasing the arm 35 in the absence of operator activity to displace the operating lever 43 from the neutral position to the drive position.

Means are also provided for braking the driven pulley 29 against rotation when the operating lever 43 is in the neutral position. While various constructions can be employed, in the illustrated construction, the driven pulley 29 includes (See FIG. 3) an integrally extending drum or cylindrical portion 75 and there is provided a brake band or member 77 which is movable relative to a position in braking engagement with the drum portion 75 of the driven pulley 29. In this last regard, at one end, the brake member 77 is pivotally connected to the blade housing 13, as for instance, by being pivotally connected to the post 39 extending from the blade housing 13, and, at its other end, the brake member 77 is pivotally connected at 79 to the arm 35 such that movement of the arm 35 to the neutral position is effective to move the brake member 77 into the braking position and such that movement of the arm 35 away from the neutral position under the influence of the spring 37 serves to displace the brake member 77 from the braking position so that, when the operating lever 43 is in the drive position, the driven pulley 29 is free to rotate under the influence of the endless belt 27. In this regard, it is noted that the connection 79 moves in the clockwise direction around the pivot shaft 36 to tighten the brake band 77 around the driven portion 75 in response to movement of the arm 35 to the neutral position.

Thus, when the operating lever 43 is in the neutral position, the arm 35 is positioned by the spring 61 in the neutral position, thereby locating the brake band or member 77 in the braking position, and locating the idler pulley 33 in non-engaged relation to the endless belt 27. When the operating lever 43 is moved from the neutral position, the arm 33 becomes free to follow the urging of the spring 37 which positions the arm 35 to displace the brake band 77 away from the braking position and to engage the idler pulley 33 with the endless belt 27 to effect power transmission from the drive pulley 31 to the driven pulley 29.

Shown in FIG. 4 is another embodiment of a control mechanism 125 which can be employed in the lawn mower 11 in lieu of the control mechanism 25 and in which the brake band or member 77 is self-energizing i.e., in which any tendency toward rotary movement of the brake band 77 when in the braking position serves to tighten the engagment of the brake band 77 with the driven pulley 29 and avoids rotating the arm 35 in the counterclockwise direction. In this last regard, and referring to the control mechanism 25 shown in FIG. 2, when the driven pulley 29 is rotating in the clockwise direction as shown by the arrow 81, there is a tendency for the brake band 77 to be carried in the clockwise direction with the driven pulley 29. Such movement of the brake band would, accordingly, tend to rotate the arm 35 in the counterclockwise direction against the action of the brake spring 61.

More particularly with respect to the embodiment shown in FIG. 4, the components of the control mechanism 125 which are the same or similar to the components of the control mechanism 25 will not be further described except to note that, in FIG. 4, the same reference numerals have been applied to these same or similar components as have been applied to the corresponding components of the control mechanism 25.

The control mechanism 125 differs primarily from the control mechanism 25 in that the end 127 of the brake band 77 is pivotally mounted to a post 129 extending fixedly from the blade housing 13 and in that the other end of the brake band 77 is pivotally connected to the end of one leg 131 of a bell crank lever 133 which is pivotally mounted on a post 135 extending fixedly from the blade housing 13 and which includes a second angularly spaced leg 137. In turn, the second leg 137 is connected to a rigid link 139 which, in turn, is pivotally connected to the arm 35 between the pivot shaft 36 and the idler pulley 33. In addition, the spring 37 is connected between the post 135 and the arm 35. Thus, in the construction shown in FIG. 4, attempted rotation of the driven pulley 29 in the clockwise direction as shown by the arrow 81, will serve to tighten engagement of the brake band 77 with the driven pulley 29 and will not serve to attempt to rotate the arm 35 in the counterclockwise direction.

Various of the features of the invention are set forth in the following claims.

What is claimed is:

1. A lawn mower comprising a blade housing, a cutter blade supported for rotation by and within said blade housing, a driven pulley drivingly connected to said cutter blade for rotation of the latter in response to rotation of the former, a drive pulley adapted to be rotatably driven by a source of power, an endless belt reeved around said drive pulley and said driven pulley, an arm, an idler pulley mounted for rotation on said arm, means mounting said arm for movement relative to a neutral position with said idler pulley disengaged from said belt, means resiliently urging said arm from said neutral position so as to engage said idler pulley with said belt to remove slack therefrom, a control linkage movable between a drive position and a neutral position, means biasing said control linkage toward said neutral position, and means connecting said linkage and said arm for displacing said arm to said neutral position against the action of said arm urging means when said control linkage is in said neutral position and for permitting movement of said arm, under the influence of said arm urging means and independently of said control linkage biasing means, from said arm neutral position so as to engage said belt to remove slack therefrom when said control linkage is in said drive position.

2. A lawn mower in accordance with claim 1 wherein said driven pulley includes a drum portion and further including a brake member mounted on said housing for movement relative to a braking position in engagement with said drum portion, and means connecting said brake member to said arm for movement of said brake member to said braking position in response to movement of said arm to said neutral position and for movement of said brake member from said braking position when said arm is moved from said neutral position.

3. A lawn mower in accordance with claim 2 wherein said brake member includes a first end pivotally mounted to said housing and a second end connected to said arm.

4. A lawn mower in accordance with claim 2 wherein said means connecting said brake member to said arm comprises a bell crank member having a first leg connected to said brake member and a second leg, means movably mounting said bell crank member on said housing, and a rigid link connecting said second leg and said arm so that, when said arm is in said neutral position, said brake member is in said braking position, and so that when said arm is moved from said neutral position, said brake member is moved from said braking position.

5. A lawn mower in accordance with claim 4 wherein said brake member includes a first end pivotally mounted to said housing and a second end pivotally connected to said first leg of said bell crank lever and wherein said means urging said arm from said neutral position is connected to said means movably mounting said bell crank member on said housing.

6. A lawn mower in accordance with claim 1 wherein said means connecting said linkage and said arm includes a lost motion connection.

7. A lawn mower in accordance with claim 6 wherein said lost motion connection comprises a slot in said arm and a part on said control linkage extending into said slot.

8. A lawn mower in accordance with claim 7 wherein said part engages said arm to move said arm to said neutral position in response to movement of said control linkage to said neutral position and wherein, when said control linkage is moved from said neutral position to said drive position, said means urging said arm urges said arm relative to said part.

* * * * *